(12) United States Patent
Hasegawa

(10) Patent No.: US 12,499,668 B2
(45) Date of Patent: Dec. 16, 2025

(54) IMAGE ANALYSIS SYSTEM AN UPDATE METHOD FOR MACHINE LEARNING MODEL

(71) Applicant: Hitachi Kokusai Electric Inc, Tokyo (JP)

(72) Inventor: Keigo Hasegawa, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 291 days.

(21) Appl. No.: 18/449,730

(22) Filed: Aug. 15, 2023

(65) Prior Publication Data

US 2023/0386188 A1 Nov. 30, 2023

Related U.S. Application Data

(63) Continuation of application No. PCT/JP2022/001751, filed on Jan. 19, 2022.

(30) Foreign Application Priority Data

Mar. 11, 2021 (JP) .................................. 2021-039112

(51) Int. Cl.
*G06V 10/778* (2022.01)
*G06V 10/774* (2022.01)
*G06V 10/776* (2022.01)

(52) U.S. Cl.
CPC .......... *G06V 10/778* (2022.01); *G06V 10/774* (2022.01); *G06V 10/776* (2022.01)

(58) Field of Classification Search
None
See application file for complete search history.

(56) References Cited

U.S. PATENT DOCUMENTS

| | | |
|---|---|---|
| 2020/0089994 A1 | 3/2020 | Sato |
| 2021/0165374 A1* | 6/2021 | Kawaharazuka ...... G06N 3/045 |
| 2021/0192183 A1 | 6/2021 | Hasegawa et al. |
| 2021/0350280 A1* | 11/2021 | Montanari ............. G06N 20/00 |
| 2022/0114478 A1* | 4/2022 | Sung ...................... G06N 20/00 |

FOREIGN PATENT DOCUMENTS

| | | |
|---|---|---|
| JP | 2020046928 | 3/2020 |
| WO | WO 2020/053953 | 3/2020 |
| WO | WO 2022/190655 | 9/2022 |

* cited by examiner

*Primary Examiner* — Leon Flores
(74) *Attorney, Agent, or Firm* — Dunlap Bennett & Ludwig PLLC

(57) ABSTRACT

An image analysis system and update method for a machine-learning model are to update a model in operation 111 to a retrained model 121, wherein in an image analysis server 1 which analyzes shot images, a first inference unit 11 performs inference using the trained model in operation 111, a relearning unit 14 performs relearning to generate a retrained model, a second inference unit 12 performs inference using a retrained model 121, and a comparison unit 15 compares the execution results of the first inference unit 11 and the second inference unit 12 to determine whether or not to update the model in operation 111 to the retrained model 121.

15 Claims, 5 Drawing Sheets

CONFIGURATION OUTLINE OF PRESENT SYSTEM

SET RELATIONS OF COMBINATIONS OF INFERENCE RESULTS OF MODEL IN OPERATION AND RETRAINED MODEL

FIG. 4

| CASE | MODEL IN OPERATION | RETRAINED MODEL | PERFORMANCE CHANGE |
|---|---|---|---|
| A | TRUE POSITIVE | TRUE POSITIVE | NO CHANGE |
| B | FALSE NEGATIVE | TRUE POSITIVE | IMPROVED RECALL |
| C | TRUE POSITIVE | FALSE NEGATIVE | REDUCED RECALL |
| D | FALSE NEGATIVE | FALSE NEGATIVE | NO CHANGE |
| E | FALSE POSITIVE | TRUE NEGATIVE | IMPROVED PRECISION |
| F | TRUE NEGATIVE | FALSE POSITIVE | REDUCED PRECISION |
| G | FALSE POSITIVE | FALSE POSITIVE | NO CHANGE |

CHANGES IN PERFORMANCE
IN RESPECTIVE CASES IN FIG. 3

IMAGE ANALYSIS SYSTEM AN UPDATE METHOD FOR MACHINE LEARNING MODEL

This is a Continuation of PCT/JP2020/001751 filed Jan. 19, 2022 and published in Japanese, which has a priority of Japanese no. 2021-039112 filed Mar. 11, 2021, hereby incorporated by reference.

BACKGROUND OF THE INVENTION

1. Field of the Invention

The present invention relates to an image analysis system to perform image analysis, and particularly to an image analysis system and an update method for a machine-learning model to update a training model properly by comparing changes in detection accuracy between a trained model in operation and a retrained model.

2. Description of the Related Art

PRIOR ART

In the most of machine learning such as deep learning in the field of Artificial Intelligence (AI) that has drawn attention in recent years, learning is done by a method called supervised learning to generate a trained model.

For example, when detecting a specific object such as to detect an invader or an intrusion vehicle from a video of a surveillance camera, a system is constructed in five steps below.

A first step is to acquire training data, in which images including persons shot under various shooting conditions (conditions different in weather, day and night, and the like) are prepared.

A second step is to label the ground truth/shooting conditions (annotation) in which training data is generated by linking each image with a region (coordinates and the like) with a target object captured therein and the attribute (a person, a vehicle, or the like).

A third step is to learn a model, in which learning is done on a computer using the training data.

A fourth step is to conduct an evaluation using test data, in which the detection accuracy of the target object is evaluated using the test data prepared separately from the training data.

A fifth step is a deploy step (to start operation) implemented in a system to perform operation.

Then, after the start of the operation, when the detection accuracy needs to be further improved, that is, when the detection accuracy is decreased due to background changes such as that a new building is built, that trees grow, or that the weather is not known (data is taken in summer, but it snows in winter), or by changing the setting of the camera quality, there is a need to relearn the model.

RELATED ART

As a related art, there is PCT International Publication No. WO 2020/053953, titled "Verification System and Verification Server" (Patent Literature 1).

In Patent Literature 1, a verification system for verifying detection data acquired by a detector with registration data registered in advance is disclosed.

PRIOR ART LITERATURE

Patent Literature

[Patent Literature 1] PCT International Publication No. WO 2020/053953

However, in the related art, when a system model the operation of which was started once is changed to a retrained model, person(s) previously detected may not be able to be detected even though the detection accuracy is improved. Since guards using the system are often engaged in operations after understanding the system features, there is a problem that a change in the system features to improve the detection accuracy is not always operationally good.

Note that, in Patent Literature 1, there is no mention of comparing changes in detection accuracy between a trained model in operation and a retrained model to update a learning model.

SUMMARY OF THE INVENTION

The present invention has been made in view of the above circumstances, and it is an object thereof to provide an image analysis system and an update method for a machine-learning model to update the learning model properly by comparing changes in detection accuracy between a trained model in operation and a retrained model.

In order to solve the problem in the conventional example mentioned above, the present invention provides an image analysis system having an image analysis server which analyzes shot images, the image analysis server including: a first inference unit which performs image analysis inference using a trained model in operation to detect a target object; a relearning unit which performs relearning to generate a retrained model; a second inference unit which performs image analysis inference using the retrained model to detect a target object; and a comparison unit which compares the execution results of the first inference unit and the second inference unit to determine whether or not to update the model in operation to the retrained model, wherein as a determination condition for updating the model in operation to the retrained model, a first condition is such that, in a region with the target object reflected therein, the number of target objects not correctly detected in the model in operation but correctly detected in the retrained model is larger than the number of target objects not correctly detected in the retrained model but correctly detected in the model in operation. The image analysis system has the effect of being able to update the model in operation to the retrained model properly by comparing the execution results of the model in operation and the retrained model.

The present invention also provides an image analysis system having an image analysis server for analyzing shot images, the image analysis server including: a first inference unit which performs image analysis inference using a trained model in operation to detect a target object; a relearning unit which performs relearning to generate a retrained model; a second inference unit which performs image analysis inference using the retrained model to detect a target object; and a comparison unit which compares the execution results of the first inference unit and the second inference unit to determine whether or not to update the model in operation to the retrained model, wherein as a determination condition for updating the model in operation to the retrained model, a second condition is such that, in a region without any target object present therein, the number of target objects falsely detected in the model in operation without being falsely detected in the retrained model is larger than the number of target objects falsely detected in the retrained model without being falsely detected in the model in operation. The image analysis system has the effect of being able to update the model in operation to the retrained model properly by comparing the execution results of the model in operation and the retrained model.

In the above image analysis system of the present invention, an operation terminal which displays the inference result of the first inference unit and the inference result of the second inference unit to input right/wrong information and ground-truth information on the detection results detected by image analysis is connected to the image analysis server.

In the above image analysis system of the present invention, the image analysis server further includes a database unit which stores the inference result of the first inference unit and the inference result of the second inference unit, the right/wrong information and the ground-truth information from the operation terminal, and information on match or mismatch of the image analysis results between the model in operation and the retrained model.

In the above image analysis system of the present invention, a third condition as a determination condition for updating the model in operation to the retrained model is such that target objects correctly detected in the model in operation but not correctly detected in the retrained model do not include those that should not be missed.

In the above image analysis system of the present invention, a fourth condition as a determination condition for updating the model in operation to the retrained model is such that target objects falsely detected in the retrained model without being falsely detected in the model in operation do not include those that should not be falsely detected.

In the above image analysis system of the present invention, a fifth condition as a determination condition for updating the model in operation to the retrained model is such that the number of target objects correctly detected in both the model in operation and the retrained model is more by a specified percentage than the number of target objects correctly detected in the model in operation.

The present invention provides an update method for a machine-learning model used on an image analysis server which analyzes shot images, including: performing image analysis using a trained model in operation to perform first inference in order to detect a target object; performing image analysis using a retrained model to perform second inference in order detect a target object; and comparing the execution results of the first inference and the second inference to determine whether or not to update the model in operation to the retrained model, wherein as a determination condition for updating the model in operation to the retrained model, a first condition is such that, in a region with the target object reflected therein, the number of target objects not correctly detected in the model in operation but correctly detected in the retrained model is larger than the number of target objects not correctly detected in the retrained model but correctly detected in the model in operation.

BRIEF DESCRIPTION OF THE DRAWINGS

FIG. 4 is a descriptive table illustrating changes in performance in respective cases in FIG. 3.

DESCRIPTION OF REFERENCE NUMERALS

1 . . . image analysis server, 2 . . . operation terminal (monitoring console), 3 . . . video acquisition device, 11 . . . first inference unit, 12 . . . second inference unit, 13 . . . database unit, 14 . . . retraining unit, 15 . . . comparison unit, 21 . . . screen/input IF, 31 . . . camera, 111 . . . model in operation, 121 . . . retrained model, 141 . . . retraining execution unit, 142 . . . retraining generated model, 151 . . . result comparison unit

DETAILED DESCRIPTION OF THE INVENTION

An embodiment of the present invention will be described with reference to the accompanying drawings.

Outline of Embodiment

An image analysis system (the present system) according to the embodiment of the present invention includes an image analysis server having a first inference unit for analyzing a captured image using a trained model in operation, a retraining unit for retraining to generate a retrained model, a second inference unit which performs inference using the retrained model, and a comparison unit which compares the execution results of the first inference unit and the second inference unit to determine an update from the model in operation to the retrained model, thus enabling the update from the model in operation to the retrained model properly by comparing the execution results of the model in operation and the retrained model.

Figure 1:
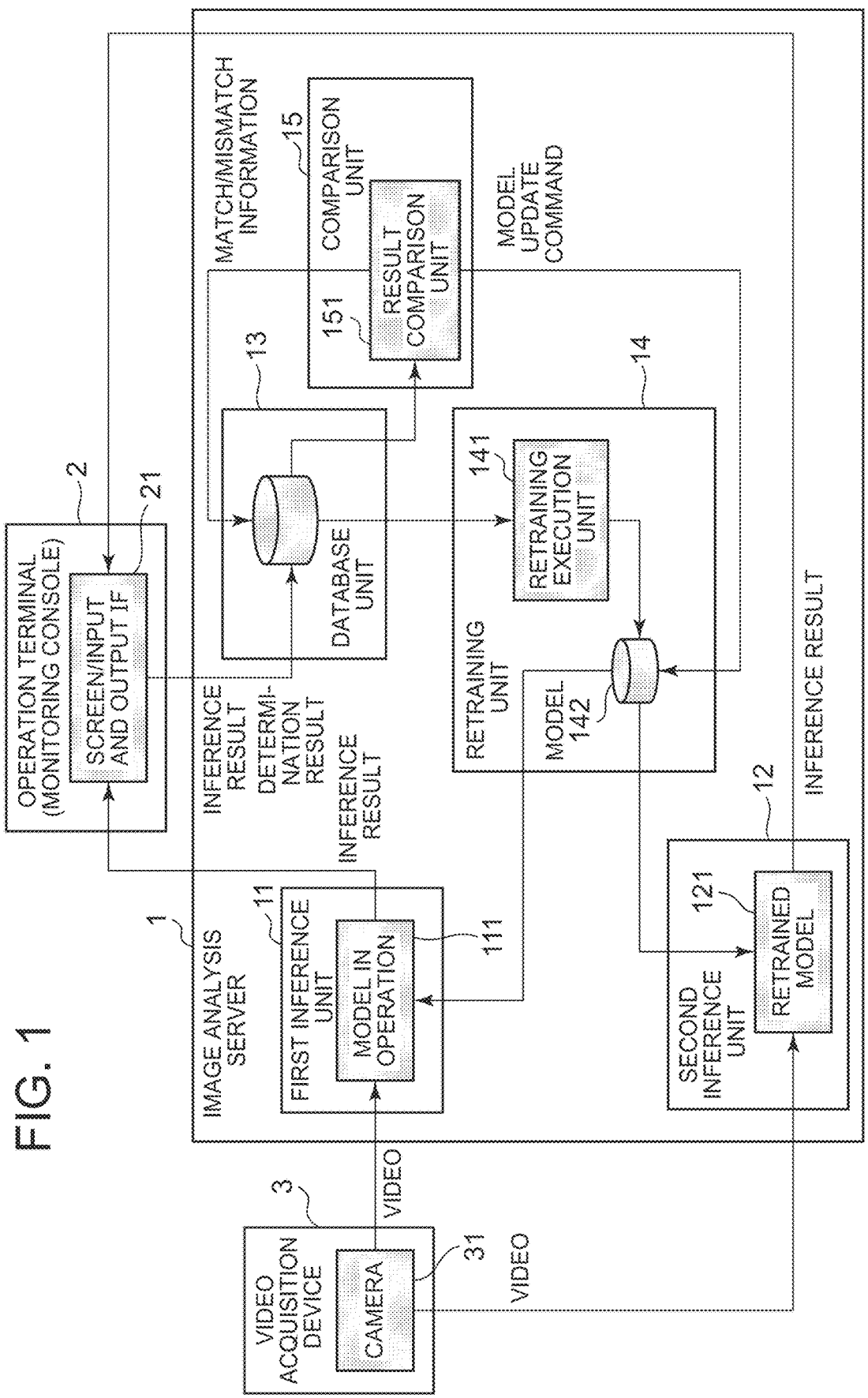
FIG. 1 is a schematic configuration diagram of the system.

[Present System: FIG. 1]

The configuration of the present system will be described with reference to FIG. 1. FIG. 1 is a schematic configuration diagram of the present system.

As illustrated in FIG. 1, the present system is composed of an image analysis server 1, an operation terminal (monitoring console) 2, and a video acquisition device 3.

In FIG. 1, the operation terminal 2 and the video acquisition device 3 are connected to the image analysis server 1, but these may also be configured to be connected through a network.

[Each Unit of Present System]
[Image Analysis Server 1]

The image analysis server 1 is realized by a high-performance computer or the like and composed of a first inference unit 11, a second inference unit 12, a database unit 13, a retraining unit 14, and a comparison unit 15.

The details of the function of each unit in the image analysis server 1 will be described later.

[Video Acquisition Device 3]

The video acquisition device 3 is realized, for example, by a network camera 31 to output a video taken with the camera to the first inference unit 11 and the second inference unit 12 of the image analysis server 1.

[Operation Terminal (Monitoring Console) 2]

The operation terminal (monitoring console) 2 is realized, for example, by a personal computer (PC) or the like and composed of a unit (display unit) for displaying the inference (image analysis) results of the first inference unit 11 and the second inference unit 12 of the image analysis server 1, a unit (input unit) for inputting the right and wrong of each of the inference results, and a unit (input unit) for inputting the ground truth for relearning.

In FIG. 1, the interface for a display screen and the interface for input and output are illustrated all together as a screen/input interface (screen/input IF) 21.

Further, the operation terminal 2 has a control unit which receives input of the inference results of the first inference unit 11 and the second inference unit 12 of the image analysis server 1, displays the inference results on the display unit, and outputs the right and wrong of each of the inference results input from the input unit (which may be simply called the "inference results" below), and outputs the ground truth (determination result) for relearning to the database unit 13 of the image analysis server 1.

[Each Unit of Image Analysis Server 1]

Each unit of the image analysis server 1 will be specifically described.

[First Inference Unit 11]

The first inference unit 11 receives input of video data from the video acquisition device 3, performs inference (image analysis) using a model in operation (trained model) 111, and outputs an inference result (first inference result) to the screen/input IF 21 of the operation terminal 2.

Further, when conditions to be described later are satisfied, the first inference unit 11 updates the model in operation 111 with a model 142 retrained by the retraining unit 14.

[Second Inference Unit 12]

The second inference unit 12 receives input of video data from the video acquisition device 3, performs inference (image analysis) using a retrained model 121, and outputs an inference result (second inference result) to the screen/input IF 21 of the operation terminal 2.

Further, when conditions to be described later are satisfied, the second inference unit 12 updates the retrained model 121 with a model 142 retrained by the retraining unit 14.

Although the first inference unit 11 and the second inference unit 12 receive the input of video data acquired by the video acquisition device 3, the video data may also be input from any other storage unit which stores data of videos already taken.

[Database Unit 13]

The database unit 13 holds the inference results of the first inference unit 11 and the second inference unit 12, the right and wrong of the inference results (True Positive/False Positive/False Negative) input from the operation terminal 2, ground-truth/shooting conditions information created on the operation terminal 2, and information on the match or mismatch of the image analysis results of the model in operation 111 and the retrained model 121.

Specifically, the database unit 13 is composed of records having keys below. As the keys, there are detection ID (identification information), model ID, frame ID, coordinates, class ID, and comparison result.

The detection ID is an ID unique to each detection result, which is the primary key.

The model ID is an ID uniquely assigned to a model used for detection (an ID uniquely assigned to each of the model in operation, the retrained mode, a past model, and the like, and used to identify the model). Note that information indicative of completion of the shooting conditions labeling is linked to the model ID. The completion-of-ground-truth/shooting conditions labeling information is information indicative of whether or not the labeling of the ground truth/shooting conditions is completed on the operation terminal 2.

The frame ID is an ID unique to each frame to distinguish which of image frames the detection result is.

The coordinates represent a region of a detected object, which is information on the x-coordinate and y-coordinate of the top left of a rectangle, and the width and the height in the case of a rectangular region.

The class ID is an ID indicative of the attribute of the detected object (a person, a vehicle, or the like).

The comparison result is information on the comparison result (match/mismatch) between the model in operation 111 and the retrained model 121. Even when both regions do not exactly match, they may be regarded as matching if they overlap more than a certain area.

[Retraining Unit 14]

The retraining unit 14 includes a unit (retraining execution unit 141) for retraining using necessary training data among data held in the database unit 13, and a unit for holding a model (retraining generated model 142) for holding a model generated by retraining.

When retraining is completed, the retraining generated model 142 is incorporated into the second inference unit 12 as the retrained model 121.

Further, when the comparison unit 15 determines that update conditions for the training model are met and a model update command is input, the model in operation 111 is replaced (recombined) with the retraining generated model 142.

This results in updating the model in operation 111 to the retrained model 121 because the retraining generated model 142 is the same as the retrained model 121.

[Comparison Unit 15]

The comparison unit 15 includes a unit (result comparison unit 151) to acquire the image analysis results of the first inference unit 11 and the second inference unit 12 from the database unit 13, and compare the image analysis results in order to determine match or mismatch of the analysis results.

Further, when the model update conditions to be described later are met, the result comparison unit 151 outputs the model update command to the retraining generated model 142 of the retraining unit 14 to incorporate the retraining generated model 142 as the retrained model is incorporated into the model in operation 111 in order to make an update from the model in operation 111 to the retrained model 121.

Figure 2:
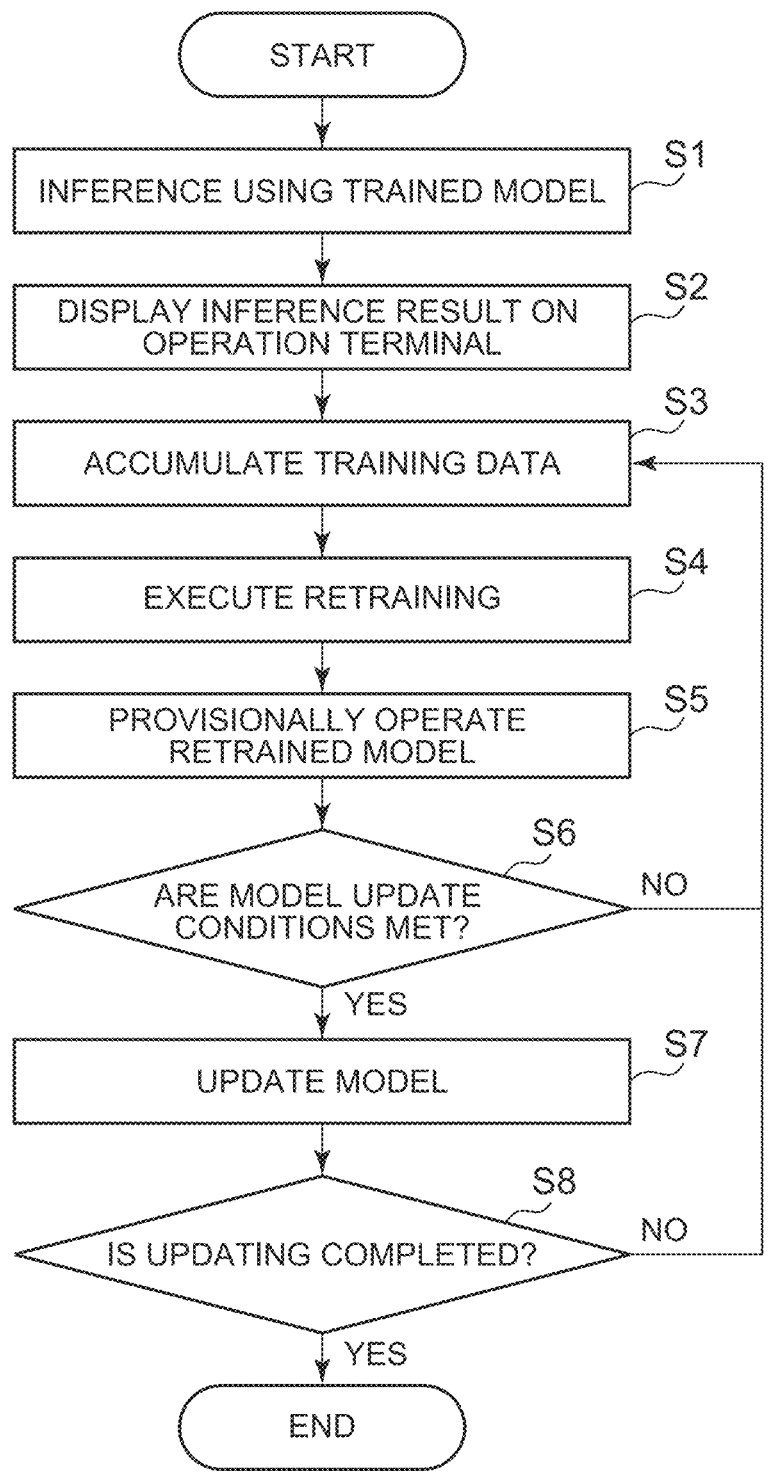
FIG. 2 is a flowchart illustrating update processing of a model in the system.

[Model Update Processing: FIG. 2]

Next, model update processing for performing inference in the present system will be described with reference to FIG. 2. FIG. 2 is a flowchart illustrating model update processing of the present system.

When the update processing is started in the present system, an inference by a model that was already trained using training data (the model in operation 111) (S1).

Next, the operation terminal 2 inputs the inference result by the first inference unit 11 and displays the inference result on the display unit (S2). In the case of normal surveillance work, the inference result can be checked to discover an invader or the like as soon as possible.

In the update processing of FIG. 2, not only is the inference result displayed on the operation terminal 2, but also the right or wrong of the notification result of the detection of a specific object such as the invader is input from the input unit of the operation terminal 2. When two or more objects are detected within a screen, the right or wrong of each detection result is input. Further, when a False Negative (Missing) is found, the False Negative is input.

Next, information input in process S2 (True Positive/False Positive/False Negative information) and corresponding video data (image data) are stored in the database unit 13 as training data to accumulate the training data (S3).

Upon retraining, for example, this information can be used for efficient retraining by adding False Positives (falsely detected) and False Negatives (missing) to the training data.

Next, retraining is executed using the image data stored in the database unit 13 (S4). At this time, when no shooting conditions are labeled, retraining is done after labeling the shooting conditions to enable learning. The labeling of the shooting conditions is, for example, to link object rectangular region information (the coordinates of the top left, the width and the height) with information on the attribute (the kind such as a person or a vehicle) and the like for each image data.

Then, an inference is made in the second inference unit 12 to verify the retrained model generated in the process S4. In other words, the retrained model 121 is operated provisionally (S5).

The inference result of the second inference unit 12 is displayed on the operation terminal 2 together with the inference result of the first inference unit 11.

Like in the process S2, the right or wrong of the respective results of the first inference unit 11 and the second inference unit 12 is input, and like in the process S3, the inference results are stored in the database unit 13.

Note that, in the verification of the retrained model in process S4, data in operation are used to adapt to the latest shooting environment, but test data accumulated in the past may also be used together for the verification. However, the test data are not used as data for retraining in order to conduct proper evaluations.

Next, the comparison unit 15 determines match or mismatch of the inference results of the model in operation 111 and the retrained model 121 stored in the database unit 13. Based on the results, it is determined whether or not the model update conditions are met (S6). The details of determination conditions will be described later.

When the update conditions are not met (in case of No), the procedure returns to process S3 to continue retraining. A data selection method during continuous retraining will be described later.

A model as the base for retraining may be either the model in operation 111 or the retrained model 121, or retraining may be done for both models to execute process S3 to process S6 in order to select the best model as a retrained model for updating.

When the model update conditions are met in the determination process S6 (in case of Yes), the comparison unit 15 updates the model (S7), and replaces the model in operation 111 used in the first inference unit 11 with the retrained model 121.

In the present system, when retraining is finished (when updating is completed/Yes in process S8), retraining is ended in this processing, while when retraining is continued (when updating is not completed/No in process S8), the procedure returns to process S3. Note that when retraining is resumed, the procedure returns to the process S1.

Figure 3:
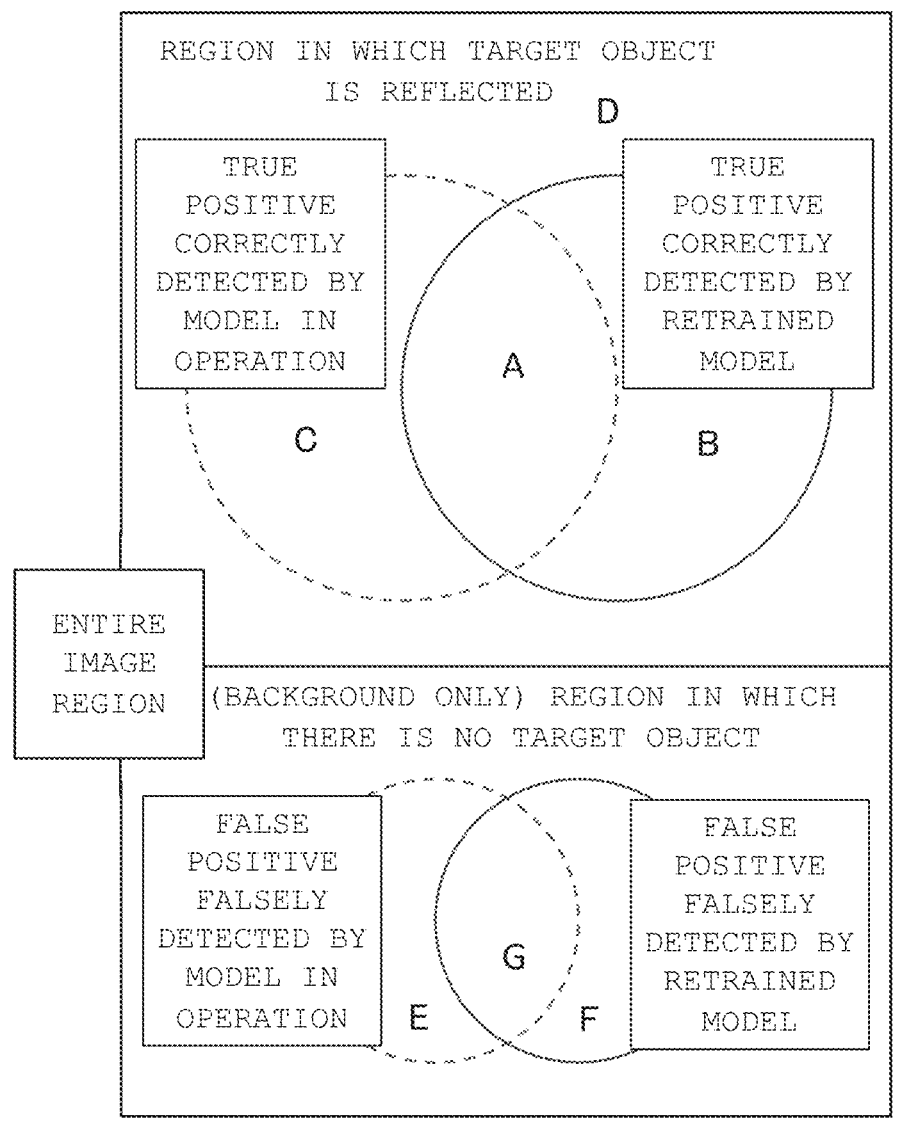
FIG. 3 is a diagram illustrating combinations of inference results of a model in operation and a retrained model represented in set relations.

[Model Update Determination Conditions: FIG. 3 and FIG. 4]

Next, model update determination conditions in the comparison unit 15 will be described with reference to FIG. 3 and FIG. 4. FIG. 3 is a diagram illustrating combinations of inference results of the model in operation and the retrained model represented in set relations, and FIG. 4 is a descriptive table illustrating changes in performance in respective cases in FIG. 3.

The combinations of the inference results of the model in operation 111 and the retrained model 121 have set relations in seven kinds of cases A to G.

All images are classified into two regions, that is, a region in which the target object is reflected and a region in which the background is reflected. An object detected in the region in which the target object is reflected is "True Positive (correctly detected)" and when no object is detected, it is "False Negative (missing)." Further, an object detected in the region in which the background is reflected is "False Positive (falsely detected)."

Since the true positive and the false positive occur differently in the model in operation 111 and the retrained model 121, respectively, a first condition and a second condition are provided to guarantee the improvement of the accuracy based on the relation in the present embodiment.

[First Condition: B−C>First Threshold]

When the number of new true positives (B) correctly detected by the retrained model 121 is larger than the number of false negatives (C) falsely not detected by retraining, since the detection rate (Recall) is improved, the first condition is that it is more than a first threshold. In other words, when the first condition for improving the detection rate is met, it is determined to update the model.

This is equivalent to the fact that a difference between the number of true positives (A+B) correctly detected by the retrained model 121 and the number of true positives (A+C) correctly detected by the model in operation 111 is compared with the first threshold.

[Second Condition: E−F>Second Threshold]

When the number of false positives no longer detected in the retrained model 121 (E) falsely detected by the model in operation is larger than the number of false positives (F) newly detected as false positives by relearning, since the false positive rate is reduced (the precision is improved), it is the second condition that (E)−(F) is more than a second threshold. In other words, when the second condition for reducing the false positive rate is met, it is determined to update the model.

This is equivalent to the fact that a difference between the number of false positives (E+G) falsely detected by the model in operation 111 and the number of false positives (F+G) falsely detected by the retrained model 121 is compared with a second threshold.

Further, a third condition, a fourth condition, and a fifth condition below may be added.

[Third Condition]

The third condition is that a phenomenon (target object) that should not be missed is not included in case (C) in which the target object is no longer detected by relearning. In other words, when the phenomenon that should not be missed is included in phenomena correctly detected by the model in operation 111 but not correctly detected by the retrained model 121, it is determined not to update the model.

[Fourth Condition]

The fourth condition is that a phenomenon that should not be falsely detected is not included in case (F) newly detected as the false positive by relearning. In other words, when the phenomenon that should not be falsely detected is included in phenomena falsely detected in the retrained model 121, it is determined not to update the model.

[Fifth Condition: A/(A+C)>Third Threshold]

The fifth condition is that targets capable of being detected by the model 111 (in operation) before retraining can be detected in more than a certain percentage. In other words, when the retrained model 121 includes (overlaps)

phenomena correctly detected by the model in operation 111 in more than a specified percentage, it is determined to update the model.

Since these conditions are characterized by using only the detection results of the model in operation 111 and the retrained model 121, and there is no need to check all the video footage in order to verify missed phenomena, it is an efficient method.

[Data Selection Method upon Retraining]

As an example of data suitable for retraining, training data is added to case (C) in which the target is no longer detected by relearning, and case (F) falsely detected by relearning as new false positives to enable efficient learning.

Since data of these cases (C) and (F) are few images automatically selected without the need to perform the ground truth labeling processing on all images, the labeling of the ground truth can be performed in a short time. Naturally, the accuracy can be improved by labeling the ground truth even on images with false negatives occurring therein.

Figure 5:
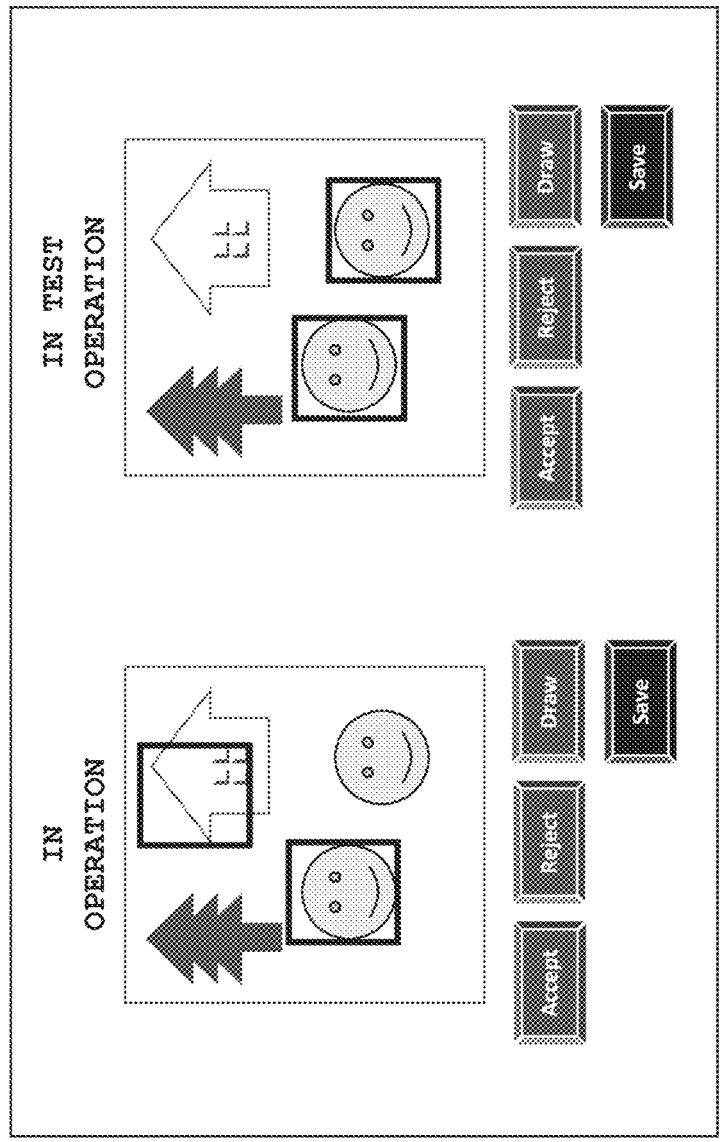
FIG. 5 is a schematic diagram illustrating a display example on an operation terminal.

[Display Example of Operation Terminal 2: FIG. 5]

Next, a display example on the display unit of the operation terminal 2 will be described with reference to FIG. 5. FIG. 5 is a schematic diagram illustrating a display example on the operation terminal.

As illustrated in FIG. 5, the operation terminal 2 has the function of displaying the image analysis results of the model in operation 111 and the model (retrained model 121) in test operation in such a manner that the analysis results for the same image can be checked side by side.

Further, the operation terminal 2 has the function of inputting "True Positive" (Accept) or "False Positive" (Reject) for each result by selecting a detection frame with a mouse operation of the input unit.

Further, the operation terminal 2 has the function of drawing a rectangle for False Negative using Draw function to label the ground truth.

Further, the two analysis result screens can be replaced with past data, and a training data set or a test data set with the ground truth labeled therein may be displayed.

Effect of Embodiment

According to the present system, in the image analysis server 1 for analyzing captured images, since the first inference unit 11 performs inference for the trained model in operation 111, the retraining unit 14 does relearning to generate the retrained model, the second inference unit 12 performs inference for the retrained model 121, and the comparison unit 15 compares the execution results of the first inference unit 11 and the second inference unit 1 to determine update from the model in operation 111 to the retrained model 121, the present system has the effect of being able to perform update from the model in operation 111 to the retrained model 121 properly by comparing the execution results of the model in operation 111 and the retrained model 121.

INDUSTRIAL APPLICABILITY

The present invention is suitable for an image analysis system and an update method for a machine-learning model to suitably update a training model properly by comparing changes in detection accuracy between a trained model in operation and a retrained model.

What is claimed is:

1. An image analysis system having an image analysis server for analyzing photo images, the image analysis server comprising:
   a first inference unit which performs image analysis inference using a trained model in operation to detect a target object;
   a relearning unit which performs relearning to generate a retrained model;
   a second inference unit which performs image analysis inference using the retrained model to detect a target object; and
   a comparison unit which compares execution results of the first inference unit and the second inference unit to determine whether or not to update the model in operation to the retrained model,
   wherein as a determination condition for updating the model in operation to the retrained model, a first condition is in a region with the target object reflected therein, a number of target objects not correctly detected in the model in operation but correctly detected in the retrained model is larger than the number of target objects not correctly detected in the retrained model but correctly detected in the model in operation,
   wherein as a determination condition for updating the model in operation to the retrained model, a third condition is that target objects correctly detected in the model in operation but not correctly detected in the retrained model do not include those that should not be missed.

2. The image analysis system according to claim 1, wherein an operation terminal which displays the inference result of the first inference unit and the inference result of the second inference unit to input right/wrong information and shooting conditions information on the detection results detected by image analysis is connected to the image analysis server.

3. The image analysis system according to claim 2, wherein the image analysis server further comprises a database unit which stores the inference result of the first inference unit and the inference result of the second inference unit, the right/wrong information and the shooting conditions information from an operation terminal, and information on match or mismatch of the image analysis results between the model in operation and the retrained model.

4. The image analysis system according to claim 1, wherein as a determination condition for updating the model in operation to the retrained model, a fifth condition is that the number of target objects correctly detected in both the model in operation and the retrained model is more by a specified percentage than the number of target objects correctly detected in the model in operation.

5. An image analysis system having an image analysis server for analyzing photo images, the image analysis server comprising:
   a first inference unit which performs image analysis inference using a trained model in operation to detect a target object;
   a relearning unit which performs relearning to generate a retrained model;
   a second inference unit which performs image analysis inference using the retrained model to detect a target object; and
   a comparison unit which compares execution results of the first inference unit and the second inference unit to determine whether or not to update the model in operation to the retrained model, wherein as a determination condition for updating the model in operation to the retrained model, a second condition is such that, in a region without any target object present therein, a number of target objects falsely detected in the model in operation without being falsely detected in the retrained model is larger than the number of target objects falsely detected in the retrained model without being falsely detected in the model in operation, wherein as a determination condition for updating the model in operation to the retrained model, a third condition is that target objects correctly detected in the model in operation but not correctly detected in the retrained model do not include those that should not be missed.

6. The image analysis system according to claim 5, wherein an operation terminal which displays an inference result of a first inference unit and the inference result of the second inference unit to input right/wrong information and shooting conditions information on detection results detected by image analysis is connected to the image analysis server.

7. The image analysis system according to claim 6, wherein the image analysis server further comprises a database unit which stores the inference result of the first inference unit and the inference result of the second inference unit, the right/wrong information and the shooting conditions information from the operation terminal, and information on match or mismatch of the image analysis results between the model in operation and the retrained model.

8. The image analysis system according to claim 5, wherein as a determination condition for updating the model in operation to the retrained model, a fourth condition is that target objects falsely detected in the retrained model without being falsely detected in the model in operation do not include those that should not be falsely detected.

9. The image analysis system according to claim 5, wherein as a determination condition for updating the model in operation to the retrained model, a fifth condition is that the number of target objects correctly detected in both the model in operation and the retrained model is more by a specified percentage than the number of target objects correctly detected in the model in operation.

10. An update method for a machine-learning model used on an image analysis server which analyzes photo images, comprising:

performing image analysis using a trained model in operation to perform first inference in order to detect a target object;

performing image analysis using a retrained model to perform second inference in order to detect a target object; and comparing execution results of a first inference and a second inference to determine whether or not to update the model in operation to the retrained model, wherein as a determination condition for updating the model in operation to the retrained model, a first condition is that in a region with the target object reflected therein, a number of target objects not correctly detected in the model in operation but correctly detected in the retrained model is larger than the number of target objects not correctly detected in the retrained model but correctly detected in the model in operation, wherein as a determination condition for updating the model in operation to the retrained model, a third condition is that target objects correctly detected in the model in operation but not correctly detected in the retrained model do not include those that should not be missed.

11. An image analysis system having an image analysis server for analyzing photo images, the image analysis server comprising:

a first inference unit which performs image analysis inference using a trained model in operation to detect a target object;

a relearning unit which performs relearning to generate a retrained model;

a second inference unit which performs image analysis inference using the retrained model to detect a target object; and a comparison unit which compares execution results of the first inference unit and the second inference unit to determine whether or not to update the model in operation to the retrained model, wherein as a determination condition for updating the model in operation to the retrained model, a first condition is in a region with the target object reflected therein, a number of target objects not correctly detected in the model in operation but correctly detected in the retrained model is larger than the number of target objects not correctly detected in the retrained model but correctly detected in the model in operation, wherein as a determination condition for updating the model in operation to the retrained model, a fourth condition is that target objects falsely detected in the retrained model without being falsely detected in the model in operation do not include those that should not be falsely detected.

12. The image analysis system according to claim 11, wherein an operation terminal which displays the inference result of the first inference unit and the inference result of the second inference unit to input right/wrong information and shooting conditions information on the detection results detected by image analysis is connected to the image analysis server.

13. The image analysis system according to claim 11, wherein the image analysis server further comprises a database unit which stores the inference result of the first inference unit and the inference result of the second inference unit, the right/wrong information and the shooting conditions information from an operation terminal, and information on match or mismatch of the image analysis results between the model in operation and the retrained model.

14. The image analysis system according to claim 11, wherein as a determination condition for updating the model in operation to the retrained model, a fifth condition is that the number of targets objects correctly detected in both the model in operation and the retrained model is more by a specified percentage than the number of target objects correctly detected in the model in operation.

15. The image analysis system according to claim 11, wherein as a determination condition for updating the model in operation to the retrained model, a fourth condition is that target objects falsely detected in the retrained model without being falsely detected in the model in operation do not include those that should not be falsely detected.

* * * * *